May 10, 1938.                B. E. MEACHAM                2,117,197
                                 COCK
                      Filed April 14, 1936        2 Sheets-Sheet 1
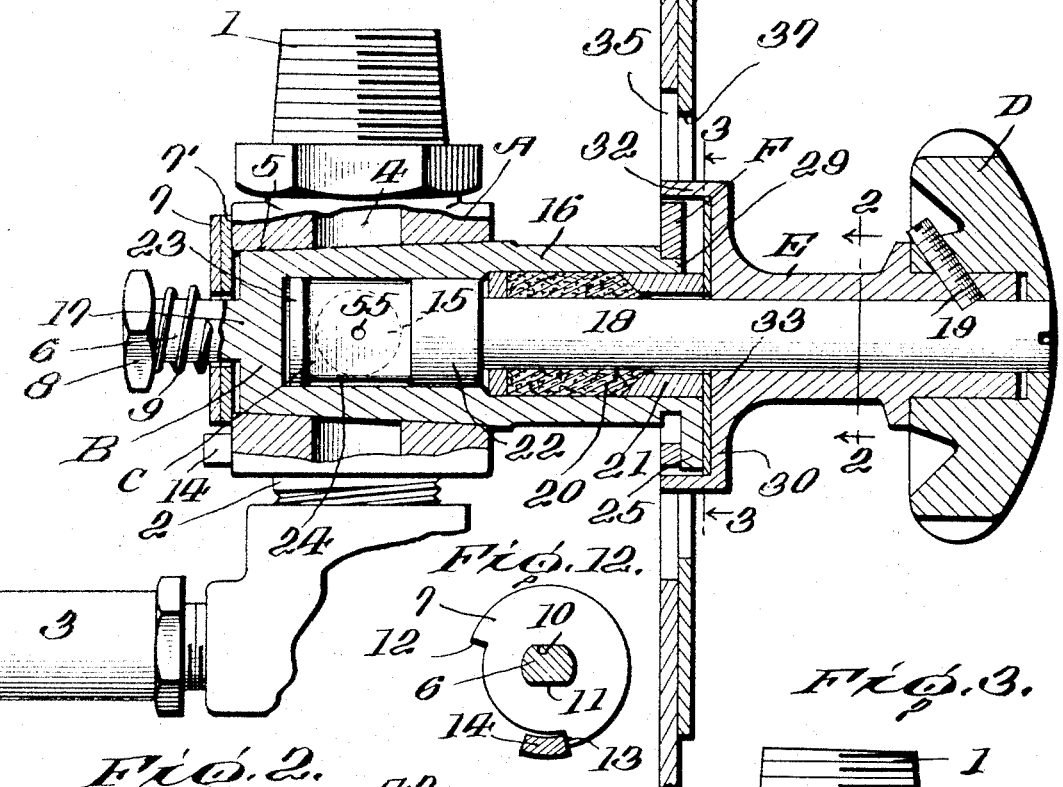
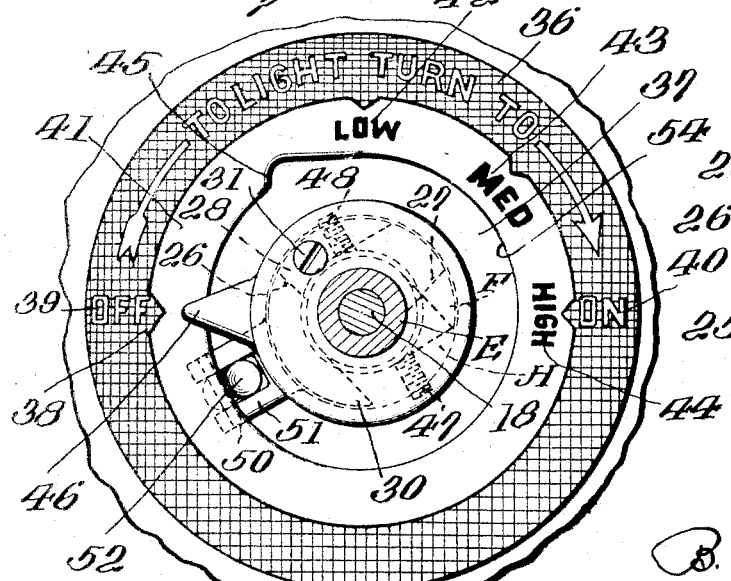
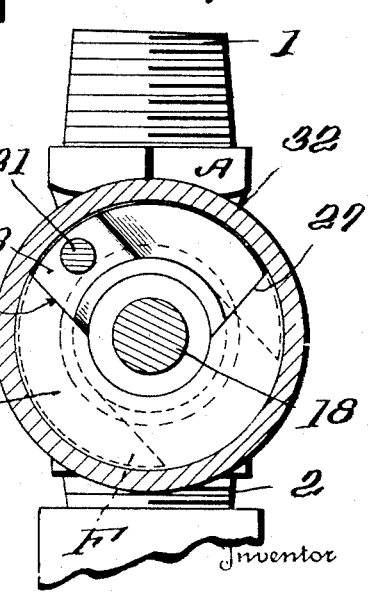
Inventor
B. E. Meacham
By Pattison, Wright & Pattison
Attorneys May 10, 1938.  B. E. MEACHAM  2,117,197
COCK
Filed April 14, 1936  2 Sheets-Sheet 2
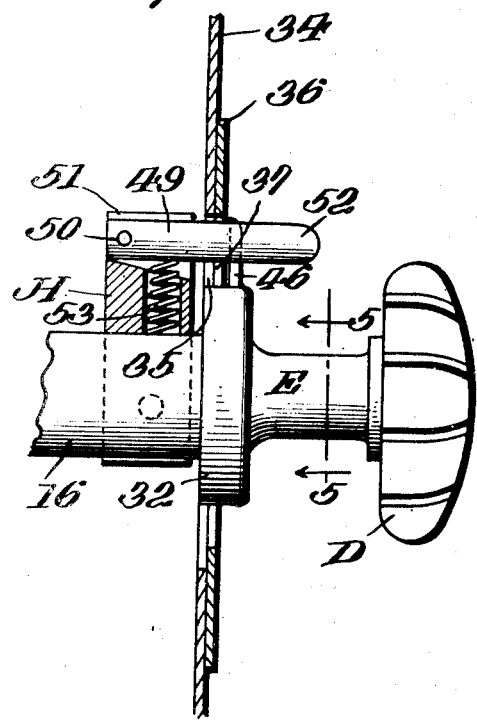
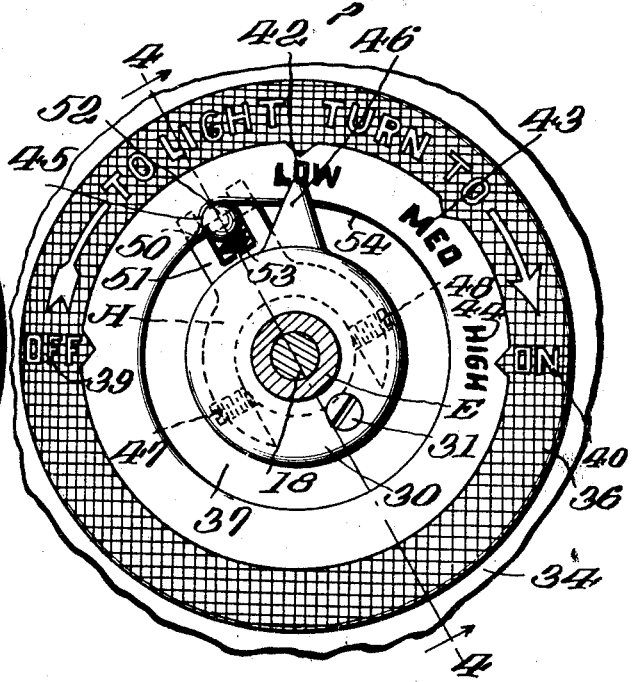
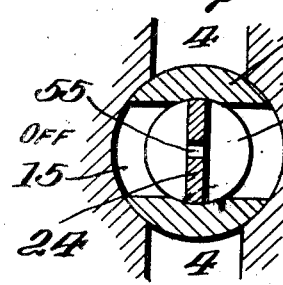
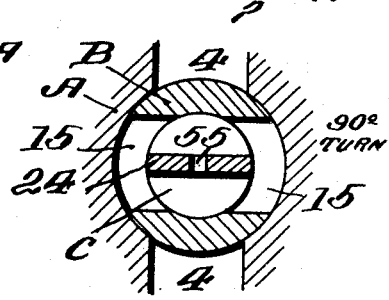
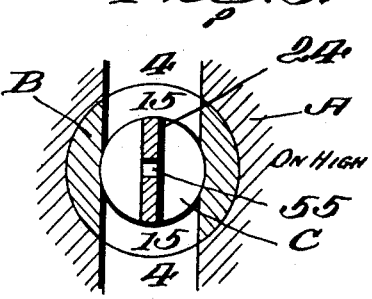
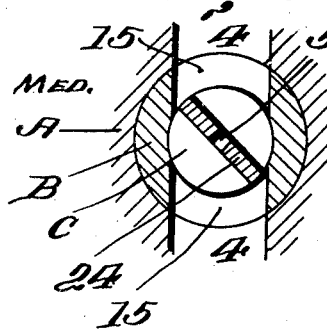
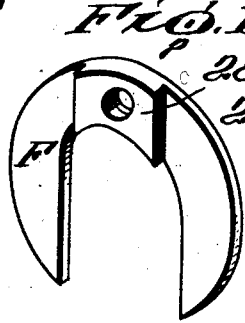
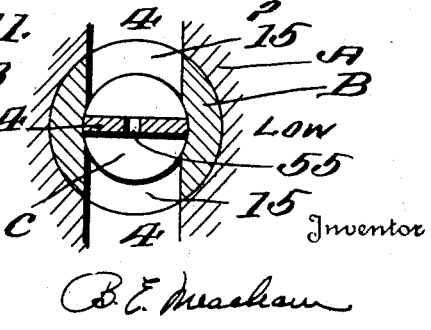

Patented May 10, 1938

2,117,197

UNITED STATES PATENT OFFICE 2,117,197

COCK

Benjamin Edward Meacham, Lorain, Ohio, assignor to American Stove Company, St. Louis, Mo., a corporation of New Jersey Application April 14, 1936, Serial No. 74,384

6 Claims. (Cl. 277—41)

It is often highly desirable to provide a device by means of which close control of the flow of a fluid through a conduit can be obtained. This particularly is true in connection with the supply of fuel to gas operated appliances. As an instance of the desirability of such a device a closed top cooking range such as is utilized in hotels might be cited. A range of this kind is operated at high temperatures usually only at meal hours, yet it is desirable throughout practically the entire day and night to maintain the top of the range warm, and to do this it is necessary to operate the burners with a low fire.

It has been found that where a gas cock of the rotary plug type is provided it is difficult to obtain the close control of fuel to the burner which is necessary and desirable, and therefore in the present device a supplemental control in the form of a valve supplemental to the main rotary plug valve is provided, and accordingly one of the objects of the invention is the provision of a valve or cock which provides a device by which a close control of the flow of a fluid through a conduit is obtainable.

A further object of the invention is the provision of a gas cock having a butterfly valve combined with a rotary plug valve.

A further object of the invention is the provision of a cock having a main valve in the form of a rotary plug and a supplemental valve in the form of a butterfly valve both of which are operable by a common operating means.

A still further object of the invention is the provision of a gas cock having a main valve of the rotary plug type and a supplemental valve of the butterfly valve type both of which are operable by a common operating means and in which provision is made whereby the butterfly valve can be operated from a fully open to a fully closed position, or vice versa, without operating the rotary plug valve.

A still further object of the invention is the provision of a safety feature in connection with the butterfly valve to prevent accidental operation of the rotary plug valve when the butterfly valve is being operated to obtain a close control of the flow of fuel through the improved gas cock.

A still further object of the invention is the provision of an improved indicator plate for indicating the respective positions of the main rotary plug valve and the butterfly valve.

A still further object of the invention is the provision of a valve having the advantages and attributes hereinbefore enumerated and which is simple and cheap of manufacture, yet highly efficient and positive in operation.

Another object of the invention is to provide means whereby some liquid can pass the supplemental or butterfly valve even when the same is fully closed the butterfly valve thereby serving the dual function of maintaining a minimum flame and also to obtain a close control of fuel by said dual functions which preferably act independently.

In the drawings:

Fig. 1 is a vertical sectional view through the improved cock.

Fig. 2 is a vertical sectional view taken on the line 2—2 of Fig. 1 looking in the direction indicated by arrows.

Fig. 3 is a vertical sectional view taken on the line 3—3 of Fig. 1 looking in the direction indicated by arrows.

Fig. 4 is a fragmentary view in side elevation, parts of the device being shown in vertical section, and illustrating the safety feature for preventing accidental movement of the plug valve to a closed position.

Fig. 5 is a vertical sectional view taken on the line 5—5 of Fig. 4 looking in the direction indicated by arrow.

Fig. 6 is a diagrammatic view illustrating the valve parts in a fully closed position and in the positions illustrated in Fig. 1 of the drawings.

Fig. 7 is a diagrammatic view illustrating the position of the valve parts after the operating wheel has been rotated 90° in a clock-wise direction towards an open position.

Fig. 8 is a diagrammatic view illustrating the valve parts in the positions they assume when both valves are fully opened and the operating wheel has been rotated 180° in a clock-wise direction.

Fig. 9 is a diagrammatic view illustrating the position of the valve parts when the operating wheel has been rotated 45° in a counter-clockwise direction from the fully open position illustrated in Fig. 8.

Fig. 10 is a diagrammatic view illustrating the plug valve as fully open and the butterfly valve as fully closed which is the positions they assume when the operating wheel has been rotated in a counter-clockwise direction 90° from a fully open position and is the position in which the valves would be found in Fig. 5 of the drawings.

Fig. 11 is a detailed perspective view of the driving shoe.

Fig. 12 is a diagrammatic end view of the improved cock illustrating the stop and the washer which cooperates therewith to limit the plug valve to 90° of rotary movement.

The present invention comprises a gas cock primarily conceived and designed to provide a device which affords a close control of the fuel delivery to a burner. This cock is particularly adapted for use in connection with solid top gas ranges such as are ordinarily referred to as heavy duty equipment and are found in hotels, hospitals and similar institutions. The cock however is not limited to use in connection with any particular type of gas range and can be used advantageously in connection with any burner when it is desired to obtain a close control of the gas or fuel delivered to the burner.

Describing the invention broadly, it comprises a valve housing or fitting A within which is rotatably mounted a plug or key valve B within which in turn is mounted a butterfly valve C. Thus it will be seen that the device comprises a valve within a valve. Both the plug or rotary valve and the butterfly valve are rotatable by a common operating handle or wheel D and the driving connection is such that the plug valve is rotated by the butterfly valve. Additionally there is a lost-motion connection in the driving mechanism whereby in rotating the plug valve 90° which moves said valve from a closed to an open position, the butterfly valve rotates 180°. The purpose of this arrangement will appear in detail hereinafter.

Describing the invention in more detail it will be seen that the valve casing or fitting is made to have its end 1 connected with a suitable source of fuel supply while its end 2 has connection with a fuel conduit 3 which is adapted to conduct the fuel to a burner or burners. The inlet and outlet ends of the valve housing are connected by a bore or passageway 4 and at right angles to said bore or passageway the fitting is provided with a second bore 5 which is tapered and rotatably receives the tapered plug valve B. The tapered bore 5 extends completely through the fitting and through one of the open ends of the bore extends a shaft 6 which is attached to and preferably formed integral with the small end of the plug valve B. A pair of washers 7 and 7' surround this shaft exteriorly of the valve fitting and between them and a nut 8 carried at the outer end of the shaft a coil spring 9 surrounds the shaft. This coil spring in combination with the nut 8 provides an adjustable tension means for holding the tapered plug tightly within its tapered seat.

The shaft 6 has flattened sides 10 and 11 and the washer 7 is designed to rotate with the shaft. In its peripheral edge the washer is provided with a cut-out portion that extends through 90° of the circumference of the washer to provide shoulders 12 and 13 which are adapted to engage a stop 14 carried by the valve housing B and thus limit the rotation of the plug to 90°. The plug is provided with an opening 15 adapted to be put into alignment with the opening 4 through the valve housing. By reference to Figures 6 and 7 of the drawings it will be seen that a 90° movement of the plug will move the same from a position where the passageway 4 is fully closed to a position where the openings 4 and 15 register and thereby put the valve in a fully open position.

The larger end of the plug B extends considerably outwardly beyond the opposite open end of the tapered valve seat as indicated at 16. The plug valve is bored out throughout practically its entire length leaving only a solid bottom or end 17. Due to this construction the plug is adapted to rotatably receive the butterfly valve C which is composed of a reduced shaft portion 18 which at its outer end carries a hub E which in turn carries the operating handle or wheel D. The hub E and wheel D are secured together against rotation and secured to the shaft portion 18 of the butterfly valve by a suitable set-screw 19 or the like. Packing 20 and 21 prevents the leakage of gas around the shaft.

At its inner end the shaft 18 has an enlarged portion 22 which has a gas-tight rotatable fit in the bore of the plug as does also its extreme end portion 23. Intermediate the enlarged portion 22 and its end 23 the shaft is machined away to provide the butterfly valve which is in reality in the form of a shutter 24 which is of a size to completely close the opening 15 in the plug when the shutter is arranged transverse this opening, as is illustrated in Figures 6 and 10 of the drawings.

At its outer end the extending portion 16 of the plug is provided with a flange or collar 25 which is of a configuration much the same as that described in respect to the washer 7 in that its peripheral edge throughout 90° thereof is cut away thus providing shoulders 26 and 27.

A driving member or shoe F which is of a horseshoe shape and provided intermediate its ends with an upwardly extending boss 28, is rotatable upon the extreme outer end 29 of the extending portion 16 of the plug and below the flange 25. The boss 28 is positioned within the cut-out segmental portion of the collar or flange 25 and has driving connection with the disc-like portion 30 of the hub by means of a screw 31 or the like.

The disc-like portion 30 of the hub D is provided with a peripheral collar 32 which forms a cup to receive the flange 25 of the plug as well as the driving shoe F. A heat insulating washer 33 is carried by the shaft portion 18 of the plug and positioned within this cup and serves to assist in keeping the operating wheel D cool when the gas cock itself is positioned or located within a zone subjected to high temperatures.

34 is a panel which could represent the closure plate of a burner chamber, and it will be seen that the valve proper lies at one side of this panel while the operating wheel and its hub lie at the other side thereof. This panel is provided with an opening 35 and carries on its outer face a plate 36 provided with an opening 37 which registers with the panel opening.

The plate 36 at its periphery has a ring 38 which is preferably black and carries bright surface wording which indicates at 39 the off position of the plug valve and at 40 the on position of the plug valve. The plate has an inner ring 41 which preferably has a bright or light finish and carries black lettering indicating at 42 the low position, at 43 the medium position and at 44 the high position of the butterfly valve C. This inner ring 41 is adjacent the opening 37 in the plate and the peripheral edge of this opening at a point adjacent the low designation of the butterfly valve is sharply indented to provide a depression or seat 45. The flared portion 30 of the hub E is provided with an outwardly extending pointer 46 adapted to move over the inner ring 38 of the plate 36.

A yoke H surrounds the portion 16 of the plug valve immediately behind the panel 34 and is adjustably secured thereto by suitable set-screws 47 and 48 whereby the yoke rotates with the plug. A trigger or finger 49 is pivotally mounted at one end as at 50 in the fork end 51 of the yoke and this finger extends outwardly through the openings 35 and 37 in the panel 34 and plate 36 and has its outer end 52 in the path of travel of the hub carried pointer 46. A coil spring 53 beneath the trigger tends at all times to hold the trigger in engagement with the peripheral edge 54 of the opening 37 of the plate 36. The shutter 24 of the butterfly valve is centrally provided with a drilled orifice 55. The size of this orifice will be dependent upon the particular kind of gas or fuel to be controlled by the valve and will be made large enough to prevent a flash-back of the burner. Said orifice 55 acts to allow a small fixed amount of fuel sufficient to maintain a continuous flame, and the butterfly valve 24 accomplishes said close control of fuel for the burners—not shown.

From the foregoing description it is thought that the following description of operation will be understood.

Operation: In Figure 1 of the drawings the valve is illustrated as being in a completely closed position. The position of the plug valve and the butterfly valve in the completely off position is diagrammatically illustrated in Figure 6 of the drawings where it will be seen that the opening 15 through the plug is at right angles to the opening 4 through the valve housing, and the shutter 24 of the butterfly valve is at right angles to the opening 15 to the plug. To open the valve the handle or wheel D is rotated in a clockwise direction and by reference to Figure 3 of the drawings it will be seen that the butterfly valve will rotate 90° freely, that is between the shoulders 26 and 27 of the flange 25, before any rotary motion is imparted to the plug. In Figure 7 the positions of the parts are illustrated after the wheel has been rotated 90°, and here it will be seen that the plug is not moved whereas the shutter 24 of the butterfly valve is moved 90° and is in an open position with respect to the opening 15 in the plug. With this 90° movement the boss 28 has engaged the shoulder 27 of the flange 25 of the plug and a further 90° movement will move the plug to a completely open position and the parts will be in the positions illustrated in Figure 8 of the drawings where it will be seen that gas or fuel can flow freely through the valve housing and pass the open shutter valve 24. When the parts are in the positions illustrated in Figure 8 the pointer 46 is opposite the high designation 44 on the indicator plate 36 and the gas flows full on.

To obtain a close control by the shutter valve it is necessary to rotate the wheel in a counter-clockwise direction and when this is done it will be found that the butterfly valve will be rotated 90° freely without in any way moving or disturbing the open plug. A 45° rotation of the wheel in a counter-clockwise direction will place the parts in the positions illustrated in Figure 9 of the drawings where it will be seen that the shutter-like valve 24 of the butterfly valve has moved to partially close the opening 15 in the plug and thus throttle the passage of fuel through the plug. When the parts are in the position illustrated in Figure 9 the pointer 46 will be opposite the medium designation on the indicator plate. A further 45° movement of the wheel in a counter-clockwise direction will move the pointer to the low designation on the indicator plate and position the parts as diagrammatically illustrated in Figure 10 of the drawings, where it will be seen that the only fuel fed to the burner is passing through the opening 55 in the shutter. As mentioned, the size of this opening is calibrated so as to permit the passage of a sufficient amount of fuel to support a flame at the burner and to prevent the burner from back-firing and to maintain a fixed constant low flame.

Should the operator attempt to rotate the wheel in a further counter-clockwise direction this would be prevented after a very limited movement by reason of the fact that the finger or trigger 52 will drop into the seat 45. Further counter-clockwise movement can only be obtained by depressing the finger against the tension of the coil spring 53 and when this is done the wheel can be rotated to move the parts to a position where the valve is fully closed. This trigger provides the necessary safe-guard to the throttling feature of the valve. Should the operator be able to accidentally rotate the handle in a counter-clockwise direction to a point beyond the low indication this would result in a movement of the plug towards a closed position and then if the wheel were rotated in a clock-wise direction the plug would be left in a partly closed position unless the wheel were rotated a full 90°. Accordingly the finger provides a safety medium to prevent this accidental occurrence and the operator cannot move the throttling butterfly valve past the medium position without doing so deliberately.

As mentioned, the finger constitutes a safety feature and although its presence is desirable in the combination it is to be recognized that it could be dispensed with as it is not absolutely essential in the combination.

By making the designating lettering on the indicator plate bright as respects one valve and dark as respects the other valve, it is believed that confusion in the operation of the valves will be avoided. The main inventive concept as respects this feature is that the designating lettering for one valve shall be distinctive as respects the designating lettering of the other valve, and it is to be recognized that this can be accomplished in numerous ways.

In the manufacture of the device the parts are so made that much less friction is incident to the rotation of the butterfly valve than is incident to the rotation of the plug valve so as to assure that there will be no rotation whatsoever of the plug valve until actual driving connection is made with the plug valve through the driving shoe F.

It has been found that it is not practical nor satisfactory to attempt to obtain a close control of the fluid passing through the valve housing by the manipulation of a rotary valve only, and it will be understood from the foregoing description that the present invention provides a simple, positive, durable and inexpensive cock for accomplishing close control of a fluid through a conduit.

Other specific novel features of construction and improved results will be so obvious from the description as to need no further definite mention, and the scope and utility of the invention is limited only in the confines of the hereinafter appended claims.

I claim:

1. An improved cock, comprising a valve housing having a passageway therethrough, a primary valve adapted to open and close said passageway and provided with a passageway, a secondary valve for controlling the passageway of the primary valve, a common actuator for both of said valves, a finger carried by said actuator, an opening in which said finger travels, means in said actuator to permit actuation of the secondary valve independent of the primary valve, the peripheral edge of said opening provided with a depression, and said finger and depression preventing accidental actuation of the secondary valve beyond a certain point when said valve is moved in a closed direction and when the primary valve is in an open position, for the purpose described.

2. An improved cock, comprising a valve housing having a passageway therethrough, a primary and a secondary valve for controlling said passageway to permit a full, medium or low flow therethrough, a common actuator for both of said valves, means in said actuator to permit an actuation of the secondary valve independent of the primary valve after both the primary and secondary valves have been opened, and means acting when both of said valves are in an open position and when the actuator is moved in a direction to close the secondary valve to lock said actuator against movement beyond a predetermined point.

3. An improved cock, comprising a valve housing having a passageway therethrough, a primary and a secondary valve for controlling said passageway to permit a full, medium or low flow therethrough, a common actuator for both of said valves and adapted to move both of them to a full open position, means in said actuator to permit actuation of the secondary valve independent of the primary valve to a position to permit selectively either a medium or low flow through said passageway, and locking means preventing the movement of said secondary valve past the setting for said low flow when said valve is moved from a higher setting towards a completely closed position.

4. An improved cock, comprising a valve housing having a passageway therethrough, a primary and a secondary valve for controlling said passageway to permit a full, medium or low flow therethrough, a common actuator for both of said valves including means permitting actuation of the secondary valve independent of the primary valve, a plate adjacent said actuator, and means carried by said actuator adapted to interlock with said plate to prevent accidental actuation of the secondary valve beyond a certain point when both of said valves are in an open position and when the actuator is moved in a direction to close the secondary valve.

5. An improved cock, comprising a valve housing having a passageway therethrough, a primary and a secondary valve for controlling said passageway adapted to permit a full flow or a close adjustment of a reduced flow through said passageway, a rotatable common actuator for both of said valves, means in said actuator to permit actuation of the secondary valve independent of the primary valve, a plate provided with an opening within which a portion of said actuator rotates, a detent carried by said actuator and disposed within said plate opening and having resilient engagement with the peripheral edge thereof, a depression in the peripheral edge of said opening providing a seat adapted to receive and lock said detent against movement in the direction it must travel when said actuator is operated to close said valves, and said seat being positioned to prevent accidental movement of the valve actuator in a closing direction beyond the low setting of the valves.

6. An improved cock, comprising a valve housing having a passageway therethrough, a primary and a secondary valve for controlling said passageway to permit a full, medium or low flow therethrough, a common actuator for both of said valves, means in said actuator to permit actuation of the secondary valve independent of the primary valve both prior and after movement of the primary valve by the actuator, and means acting when both of said valves are in an open position and when the actuator is moved in a direction to close the secondary valve to lock said actuator against movement before said actuator begins to move said primary valve towards a closed position.

BENJAMIN EDWARD MEACHAM.